United States Patent
Sakurai

(10) Patent No.: US 10,628,080 B2
(45) Date of Patent: Apr. 21, 2020

(54) MEMORY CONTROLLER, INFORMATION PROCESSOR, AND MEMORY CONTROL METHOD

(71) Applicant: FUJITSU LIMITED, Kawasaki-shi, Kanagawa (JP)

(72) Inventor: Yasutomo Sakurai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/884,443

(22) Filed: Jan. 31, 2018

(65) Prior Publication Data

US 2018/0267745 A1    Sep. 20, 2018

(30) Foreign Application Priority Data

Mar. 15, 2017   (JP) ................... 2017-050471

(51) Int. Cl.
| | | |
|---|---|---|
| *G06F 3/06* | (2006.01) | |
| *G06F 13/16* | (2006.01) | |
| *G06F 12/02* | (2006.01) | |

(52) U.S. Cl.
CPC ............ *G06F 3/0659* (2013.01); *G06F 3/061* (2013.01); *G06F 3/0619* (2013.01); *G06F 3/0673* (2013.01); *G06F 3/0679* (2013.01); *G06F 12/0223* (2013.01); *G06F 13/16* (2013.01); *G06F 13/1642* (2013.01)

(58) Field of Classification Search
CPC ....... G06F 3/0659; G06F 3/061; G06F 3/0673
See application file for complete search history.

(56) References Cited

U.S. PATENT DOCUMENTS

| | | | | | |
|---|---|---|---|---|---|
| 5,559,956 | A | * | 9/1996 | Sukegawa | ........... G06F 12/0246 711/E12.014 |
| 6,324,624 | B1 | * | 11/2001 | Wolrich | ................... G06F 9/52 710/200 |
| 6,490,642 | B1 | * | 12/2002 | Thekkath | .............. G06F 13/364 710/108 |
| 7,315,915 | B2 | * | 1/2008 | Fukuda | .................. G11C 16/16 711/103 |
| 8,320,067 | B1 | * | 11/2012 | Tsai | ....................... G11B 27/36 360/31 |
| 8,725,975 | B2 | * | 5/2014 | Moyer | ................. G06F 11/1008 711/166 |
| 9,672,882 | B1 | * | 6/2017 | Jeter | ..................... G11C 7/1066 |
| 9,911,478 | B1 | * | 3/2018 | Peddu | ...................... G11C 7/22 |
| 2002/0174310 | A1 | * | 11/2002 | Ueyama | .............. G06F 12/1416 711/163 |
| 2002/0174392 | A1 | * | 11/2002 | Chang | ....................... G11C 8/12 714/718 |
| 2002/0188816 | A1 | * | 12/2002 | Johnson | .............. G06F 13/1694 711/167 |

(Continued)

FOREIGN PATENT DOCUMENTS

JP         10-149318         6/1998

*Primary Examiner* — Ramon A. Merado
(74) *Attorney, Agent, or Firm* — Fujitsu Patent Center

(57) ABSTRACT

A memory controller includes: a memory access control circuit which receives a write command and write data from a processor and controls a writing operation to a memory; and a number-of-writing-operations control circuit which performs control to execute the writing operation to the memory multiple times, based on the write command and the write data.

19 Claims, 11 Drawing Sheets

(56) References Cited

U.S. PATENT DOCUMENTS

| | | | |
|---|---|---|---|
| 2006/0018162 A1* | 1/2006 | Kawai | G11C 16/12 365/185.28 |
| 2008/0028177 A1* | 1/2008 | Bartley | G06F 13/1668 711/167 |
| 2008/0313387 A1* | 12/2008 | Shibata | G11C 16/26 711/103 |
| 2009/0161453 A1* | 6/2009 | Giovannini | G11C 7/1078 365/193 |
| 2013/0339320 A1* | 12/2013 | Noda | G06F 11/1004 707/692 |
| 2014/0059280 A1* | 2/2014 | Im | G06F 3/0688 711/103 |
| 2014/0237205 A1* | 8/2014 | Takefman | H03M 13/05 711/162 |
| 2014/0258606 A1* | 9/2014 | Nakanishi | G11C 11/40622 711/105 |
| 2016/0267975 A1* | 9/2016 | Takeuchi | G11C 13/0007 |
| 2016/0313917 A1* | 10/2016 | Xu | G06F 11/3485 |
| 2016/0322074 A1* | 11/2016 | Niu | G11B 5/59627 |
| 2017/0093597 A1* | 3/2017 | Ranck | H04L 12/46 |
| 2017/0148501 A1* | 5/2017 | Son | G11C 11/4093 |
| 2018/0136851 A1* | 5/2018 | Batra | G06F 3/0607 |
| 2018/0267745 A1* | 9/2018 | Sakurai | G06F 3/0659 |

* cited by examiner

MEMORY CONTROLLER, INFORMATION PROCESSOR, AND MEMORY CONTROL METHOD

CROSS-REFERENCE TO RELATED APPLICATION

This application is based upon and claims the benefit of priority of the prior Japanese Patent Application No. 2017-050471, filed on Mar. 15, 2017, the entire contents of which are incorporated herein by reference.

FIELD

The embodiments discussed herein are related to a memory controller, an information processor, and a memory control method.

BACKGROUND

In the case where product development is carried out based on a memory trend assumed at the time of the system development planning, there is a risk that memory operation in a specific case or at a specific timing is unknown at the time of actually designing details of the system because the specification of the memory to be used is not fixed yet.

A related art is disclosed in Japanese Laid-open Patent Publication No. 10-149318.

SUMMARY

According to an aspect of the embodiments, a memory controller includes: a memory access control circuit which receives a write command and write data from a processor and controls a writing operation to a memory; and a number-of-writing-operations control circuit which performs control to execute the writing operation to the memory multiple times, based on the write command and the write data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
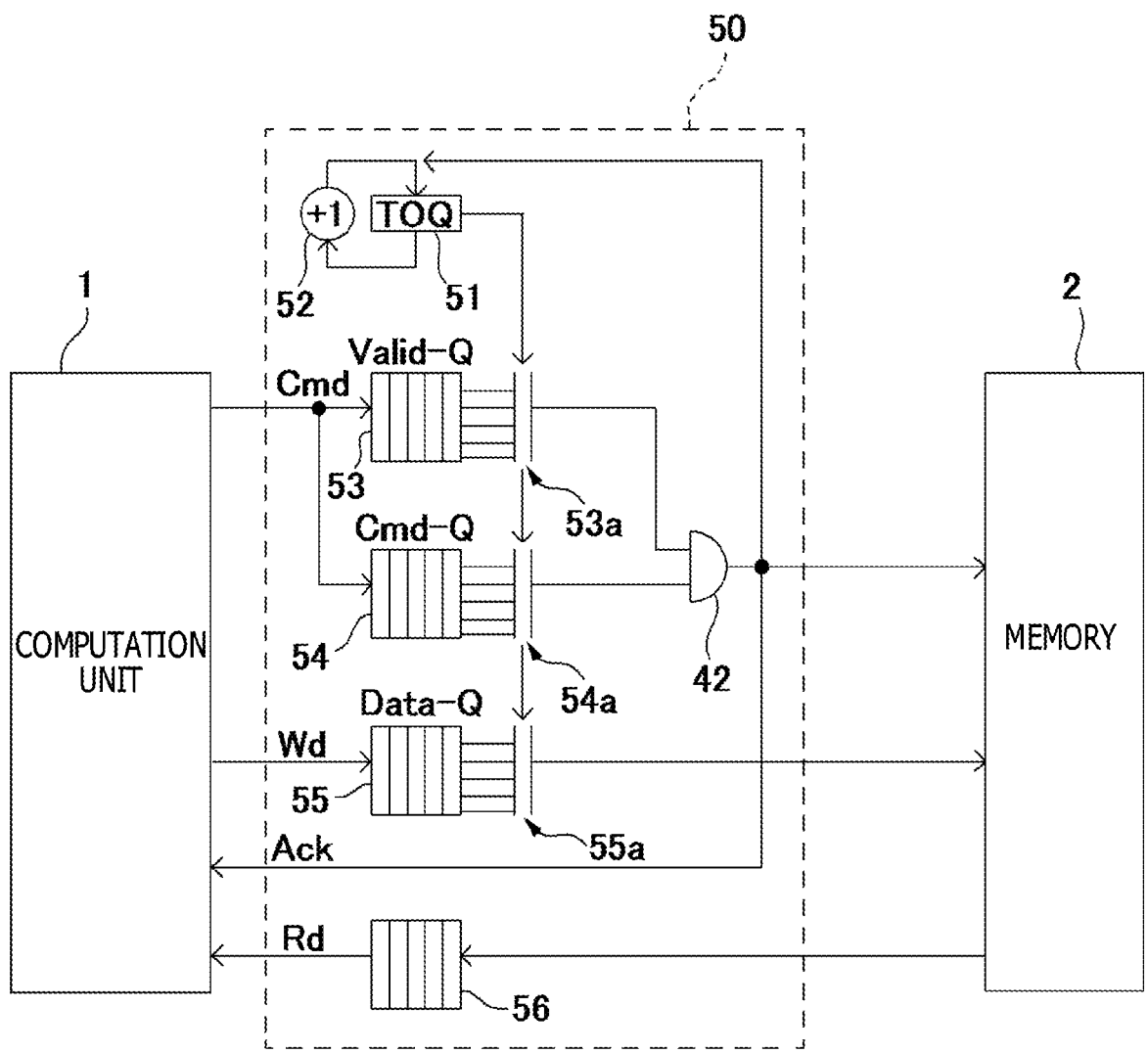
FIG. 1 illustrates an example of an information processor.

For example, a memory into which a memory chip and a memory interface converter are integrated is developed for Hybrid Memory Cube (HMC) and the like. For example, since a memory interface converter includes complicated logic circuits, sometimes the fix of the specification delays. For this reason, there is a case where the operation of the memory in a certain case or at certain timing is unknown, or a case where an unclear part in the specification, which had not been noticed at a design stage, is found at an evaluation stage after the production.

For example, there is a case where a delay of memory development causes insufficient evaluation at the memory manufacturer. For example, there is a possibility that a memory in which memory chips are stacked and densely packaged, such as HMC, may potentially have a new problem factor, such as a crosstalk noise caused by the stacking.

To prepare for such cases, for example, a memory controller is provided with functions which makes it possible to follow an actual behavior of the memory, by including various risk avoidance functions for unclear parts in the specification of the memory, problems which are not removed before shipping, and the like.

For example, a memory controller receives a write command and write data from a computation unit (for example, a micro processing unit (MPU)) and controls the writing operation to a memory.

As described above, for example, for memories such as HMC, there may be a case where write processing to the memory is not reliably executed with various factors, such as specification of a memory interface converter, a crosstalk noise resulted from stacking memory chips, or a timing problem.

For example, the read-modify-write command is a command to read data from a memory, replace a part of the data with other data, and write back the data to the memory. There is a possibility that a problem occurs when the read-modify-write operation is executed. It is caused because, for example, specification for the read-modify-write operation is unclear, or data to be substituted (written back to the memory) are dropped at a specific timing, which is resulted from the inside of the memory chip, the memory interface converter, or the memory access control circuit side.

Occurrence of such a dropout of write data to a memory is not limited to memories such as HMC or at the time of executing the read-modify-write command, but it is possible that a dropout occurs in writing data to various memories.

For example, to re-execute write processing, a special circuit is provided to be implemented in the computation unit, or software processing is added. For example, whether data were written to a memory correctly is checked when the written data are read, and a data error is detected by a checkpoint set by software. For example, data written to a memory are not read soon in some cases. Hence, in the case where the writing operation is not executed properly, it may be difficult to investigate when and in what write data an error occurred if the symptom is not easily reproduced.

Figure 2:
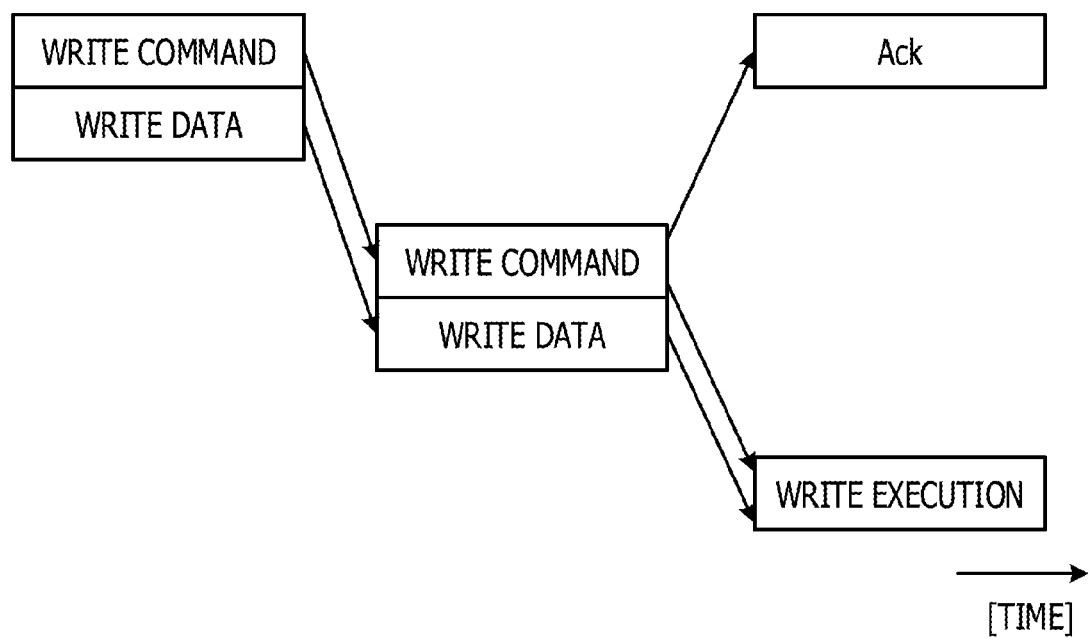
FIG. 2 illustrates an example of operation of a memory controller in the information processor illustrated in FIG. 1.

FIG. 1 illustrates an example of an information processor. FIG. 2 illustrates an example of operation of a memory controller in the information processor illustrated in FIG. 1.

As illustrated in FIG. 1, the information processor includes a computation unit (MPU) 1, a memory 2, and a memory controller 50. In addition, the information processor includes internal circuits to implement various functions.

The memory controller 50, for example, receives a write command Cmd and write data Wd from the computation unit 1 and controls writing operations to the memory 2. Although the memory controller 50 executes not only writing operations from the computation unit 1 to the memory 2, but reading operation from the memory 2 and others, descriptions are provided mainly for the writing operation and the read-modify-write operation.

The memory controller 50 includes a command queue (Cmd-Q) 54 to store commands Cmd from the computation unit 1 and a valid queue (Valid-Q) 53 to store valid signals indicating whether commands are valid or invalid. The memory controller 50 includes a command multiplexer 54a to select a command stored in the command queue 54, and a valid signal multiplexer 53a to select a valid signal stored in the valid queue 53.

The memory controller 50 includes a write data queue (Data-Q) 55 to store write data Wd from the computation unit 1, a read data queue 56 to store read data Rd read from the memory 2, and an AND gate 42. The memory controller 50 includes a write data multiplexer 55a to select write data stored in the write data queue 55 and a top of queue (TOQ) 51 to specify a head queue in each of the multiplexers 53a, 54a, and 55a.

The top of queue 51, for example, increments a number by +1 (52) one after another to control the multiplexers 53a, 54a, and 55a. The AND gate 42 performs a logical AND between the outputs of the multiplexers 53a and 54a, generates an acknowledgement (response signal) Ack, and outputs it to the computation unit 1. The acknowledgement Ack is also inputted to the top of queue 51. The top of queue 51 receives the acknowledgement Ack, controls the multiplexers 53a, 54a, and 55a with the incremented signal, for example, and executes the next processing.

In the information processor illustrated in FIG. 1, when a writing operation from the computation unit 1 to the memory 2 is executed, the write command Cmd and the write data Wd are outputted from the computation unit 1 to the memory controller 50. Here, as illustrated in FIG. 2, the write command (Cmd) and the write data (Wd) stored (set) in the queues 54 and 55, respectively, are selected by the multiplexers 54a and 55a based on a signal from the top of queue 51, and outputted to the memory 2. With this, write processing to the memory 2 is executed, an acknowledgement (response signal) Ack is returned to the computation unit 1, and the memory write processing is completed.

For example, there may be a case where write processing to the memory 2 is not reliably executed with various factors, such as specification of the memory 2, a noise, or a timing problem. For example, in the case where the memory 2 is HMC or the like, there may be the occurrence of a crosstalk noise due to stacking memory chips or a timing problem at the memory interface converter, and problems often occur when the read-modify-write command is executed. The problem of a dropout of data written to a memory like this is not limited to memories such as HMC, or not limited at the time when the read-modify-write command is executed. The problem also may occur at the time of writing data to various memories.

Figure 3:
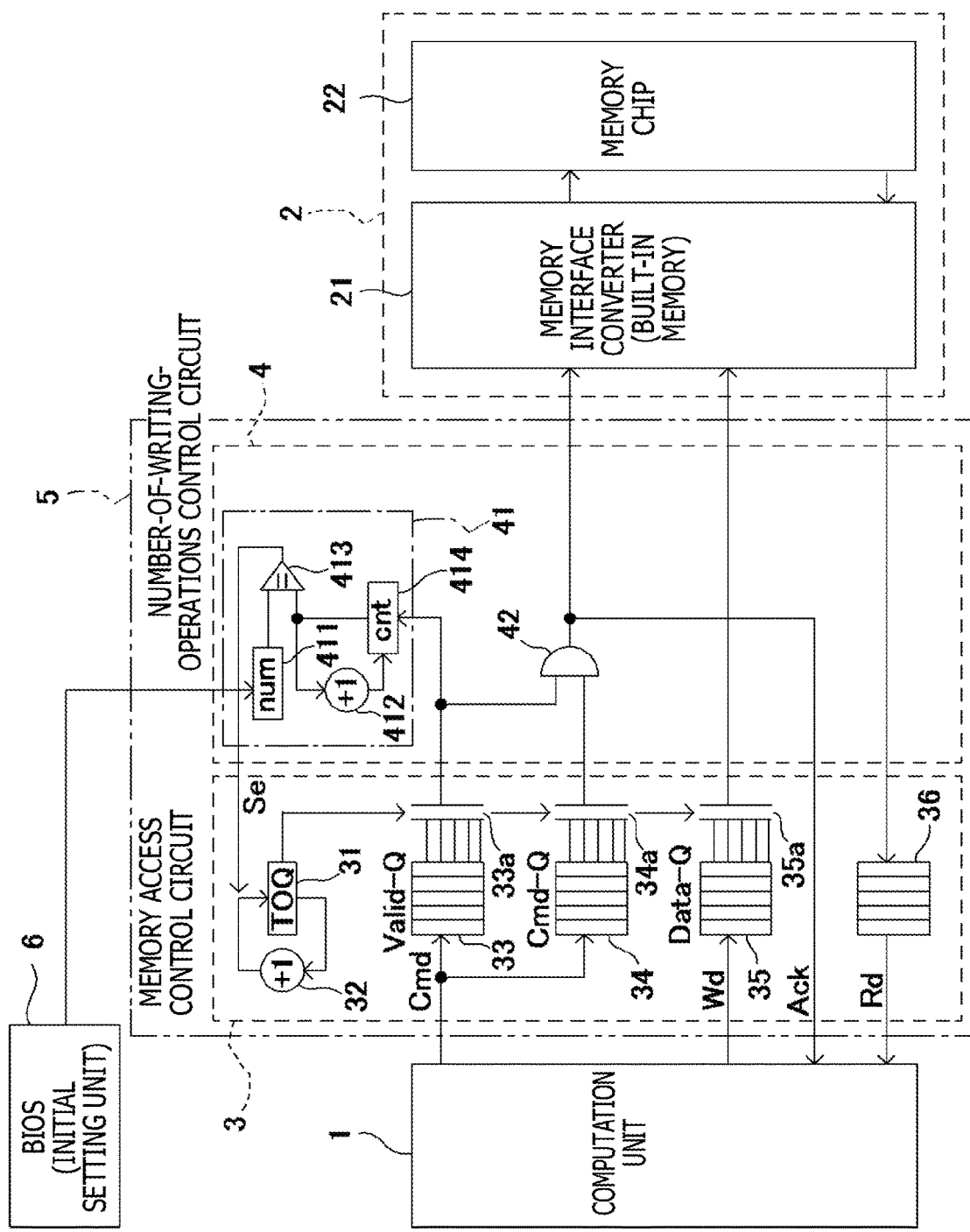
FIG. 3 illustrates an example of an information processor.
Figure 4:
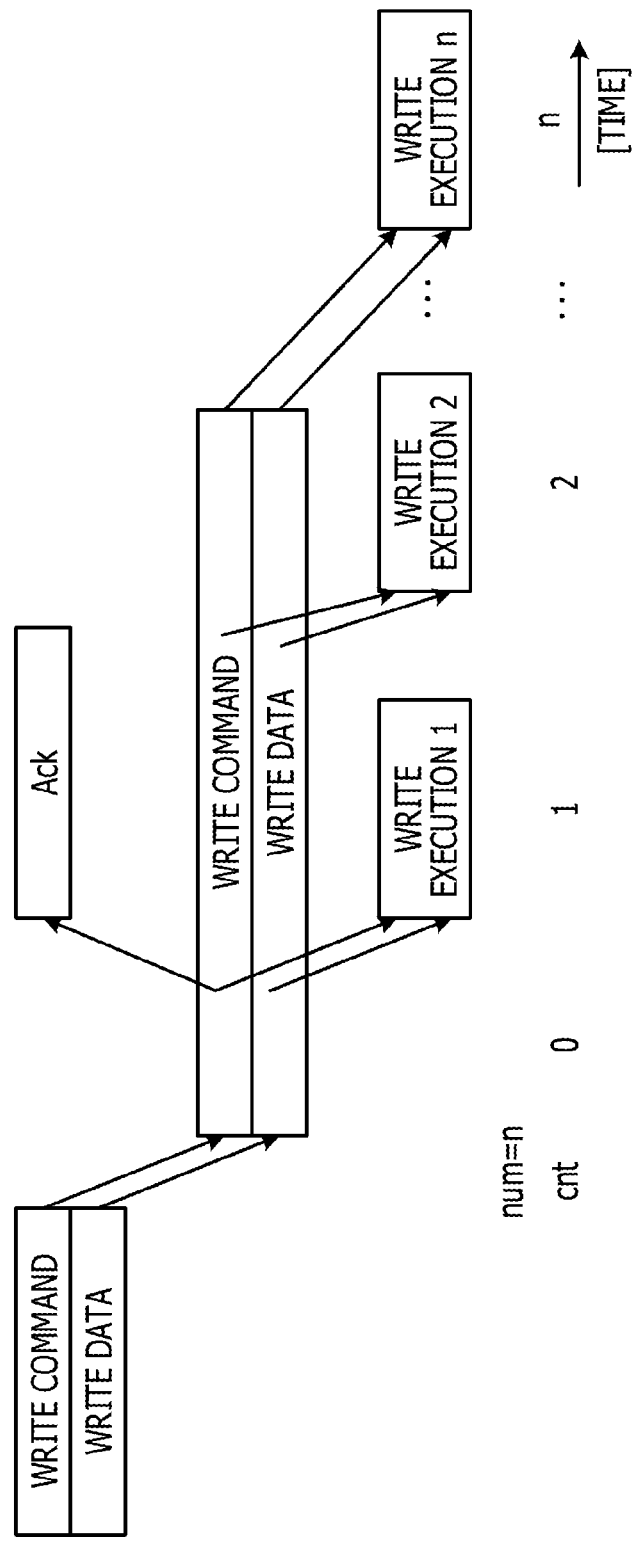
FIG. 4 illustrates an example of operation of a memory controller illustrated in FIG. 3.

FIG. 3 illustrates an example of an information processor. FIG. 4 illustrates an example of operation of the memory controller illustrated in FIG. 3.

As illustrated in FIG. 3, the information processor of a first embodiment includes a computation unit (MPU) 1, a memory 2, a memory controller 5, and a BIOS (Basic Input/Output System: initial setting unit) 6. The memory controller 5, which, for example, receives the write command Cmd and the write data Wd from the computation unit 1 and controls writing operations to the memory 2, includes a memory access control circuit 3 and a number-of-writing-operations control circuit 4. The information processor includes internal circuits to implement other various functions, and the memory controller 5 executes not only writing operations from the computation unit 1 to the memory 2, but also reading operations from the memory 2 and others.

The memory 2, which is HMC or the like, includes a memory interface converter 21 and a memory chip 22 formed of stacked multiple memory chips (dice: DRAM chips). This embodiment is not limited to HMC, but may be widely applied to various memories. This also applies to other embodiments to be described later.

The memory access control circuit 3 includes a command queue (Cmd-Q) 34 to store write commands Cmd from the computation unit 1 and a valid queue (Valid-Q) 33 to store valid signals indicating whether commands are valid or invalid. The memory access control circuit 3 also includes a command multiplexer 34a to select a command stored in the command queue 34 and a valid signal multiplexer 33a to select a valid signal stored in the valid queue 33.

The memory access control circuit 3 further includes a write data queue (Data-Q) 35 to store write data Wd from the computation unit 1 and a read data queue 36 to store read data Rd read from the memory 2. The memory access control circuit 3 includes a write data multiplexer 35a to select write data stored in the write data queue 35 and a top of queue (TOQ) 31 to specify a head queue in each of the multiplexers 33a, 34a, and 35a. The top of queue 31, for example, increments a number by +1 (32) one after another to control the multiplexers 33a, 34a, and 35a.

The number-of-writing-operations control circuit 4 includes a number-of-writing-operations setting circuit 41 to set the number of writing operations to the memory 2, and an AND gate 42. Here, the AND gate 42 corresponds to the AND gate 42 in the memory controller 50 illustrated in FIG. 1. The AND gate 42 performs an AND between the outputs of the multiplexers 33a and 34a to generate an acknowledgement (response signal) Ack and outputs it to the computation unit 1.

The number-of-writing-operations setting circuit 41, for example, sets the number of writing operations to the memory 2 for a single memory write command, based on an initial setting by the BIOS 6. The number-of-writing-operations setting circuit 41 includes a register (num) 411 for setting the number of writing operations specified by the BIOS 6, a counter (cnt) 414 to count the number of writing operations to the memory 2, and a comparator 413. Here, the counter 414, for example, is incremented by +1 (412) one after another every time a writing operation to the memory 2 is executed.

When the output (count value) of the counter 414 agrees to the value set in the register 411, the comparator 413 outputs to the top of queue 31, an end signal Se indicating that a specified number of writing operations have been executed. The top of queue 31, receiving the end signal Se, for example, controls the multiplexers 33a, 34a, and 35a with the incremented signal to execute the next processing.

In the information processor illustrated in FIG. 3, when writing operations from the computation unit 1 to the memory 2 are executed n times, the number of writing operations n is set (num=n) in the register 411 by the BIOS 6, for example. For example, the register 411 is a register for setting how many times memory write operations are executed for a single memory write command. This register 411 is, for example, set by an evaluator at the time of evaluation before shipment, and may be set with the BIOS 6 or the like. Note that the method for setting of the number of writing operations n is not limited to the BIOS 6, but, for example, the setting of the number of writing operations n may be set by an initial setting of another circuit.

The computation unit 1 outputs the write command Cmd and the write data Wd to the memory controller 5 (memory access control circuit 3). The write command Cmd and the write data Wd stored in the queues 34 and 35, respectively, are selected by the multiplexers 34a and 35a based on the signal from the top of queue 31, and outputted to the memory 2. Here, the outputs of the multiplexers 34a and 35a are outputted continuously and used in the n writing operations.

When the top of queue 31 selects a memory write instruction, the memory write instruction is given to the memory interface converter 21 and a writing operation to the memory chip 22 is executed, for example. In this case, every time a memory write instruction is given to the memory interface converter 21, the count value (cnt) in the counter 414 is incremented by +1. Then, until the count value reaches the set value (num) in the register 411, the same memory write instruction is repeatedly given to the built-in memory in the memory interface converter 21.

For example, as illustrated in FIG. 4, when the first writing operation (write execution 1) is executed, the output of the counter 414 is incremented by +1 to "1". When the second writing operation (write execution 2) is executed, the output of the counter 414 is further incremented by +1 to "2". Then, when the n-th writing operation (write execution n) is executed, the output of the counter 414 (cnt=n) agrees to the number (num=n) set in the register 411, and the comparator 413 outputs the end signal Se.

As illustrated in FIG. 4, in the information processor (memory controller 5), the acknowledgement Ack, which is an output of the AND gate 42, is generated at the timing when the first (initial) writing operation is executed, and outputted to the computation unit 1 and the memory 2.

For example, in the case where num=4 is set as an initial setting by the BIOS 6, the memory write instruction is given four times. Note that since memory write processing may be throw-off type processing, it is possible to make the response (Ack) to the computation unit 1 at the first memory write instruction.

As described above, in the information processor (memory controller 5), dropout of write processing to the memory may be avoided and, for example, therefore, an isolation at a failure may be performed quickly and the reliability of the system may be improved. The quick isolation at a failure and the improvement of the system reliability described above may be achieved without changing a circuit of the computation unit or adding software processing. This effect is also obtained from the later-described embodiments.

Figure 5:
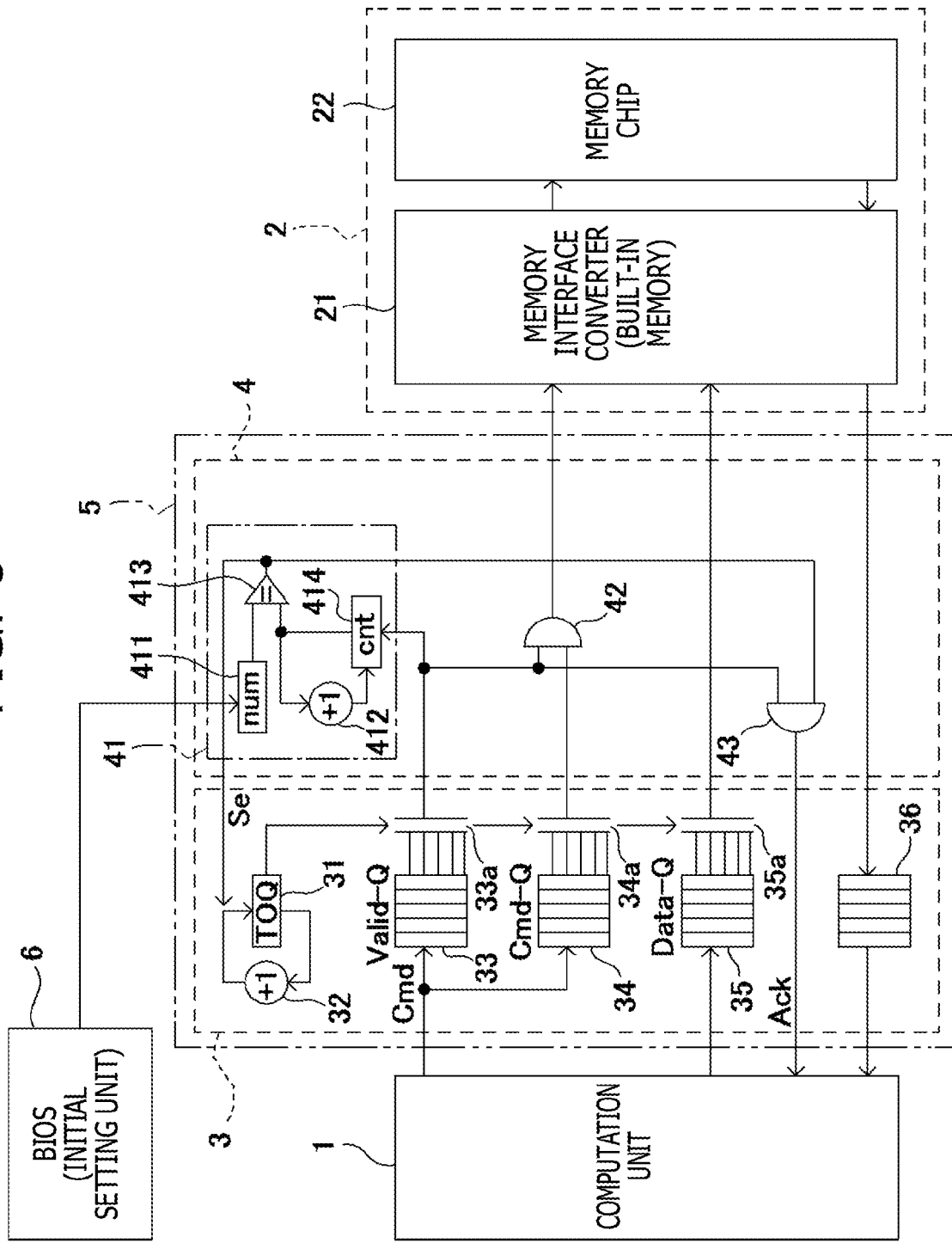
FIG. 5 illustrates an example of an information processor.
Figure 6:
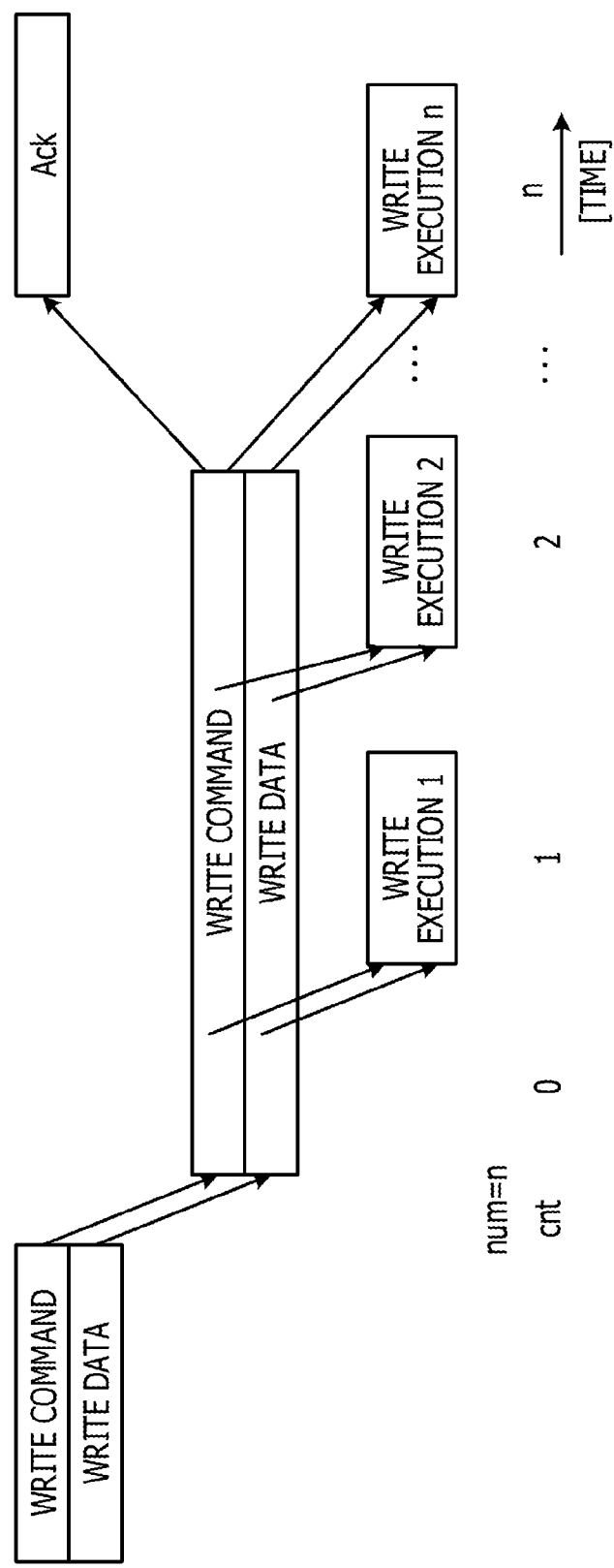
FIG. 6 illustrates an example of operation of a memory controller illustrated in FIG. 5.

FIG. 5 illustrates an example of an information processor. FIG. 6 illustrates an example of operation of a memory controller illustrated in FIG. 5. As is apparent from the comparison between FIG. 5 and FIG. 3, the information processor illustrated in FIG. 5 further includes an AND gate 43. The acknowledgement (response signal) Ack to the computation unit 1 is taken not from the output of the AND gate 42, but from the output of the AND gate 43 which performs an AND between the outputs of the valid signal multiplexer 33a and the comparator 413.

For example, as illustrated in FIG. 6, the acknowledgement Ack, which is the output of the AND gate 43, is generated not at the timing of the initial (first) writing operation but at the timing of the last (n-th) writing operation, and is outputted to the computation unit 1. For example, the acknowledgement Ack to the computation unit 1 is issued when the last write instruction is given to the memory interface converter 21. Although the memory write processing may be throw-off type processing, in order to make the operation safer, the response (Ack) to the computation unit 1 is issued at the n-th (last) memory write instruction.

Figure 7:
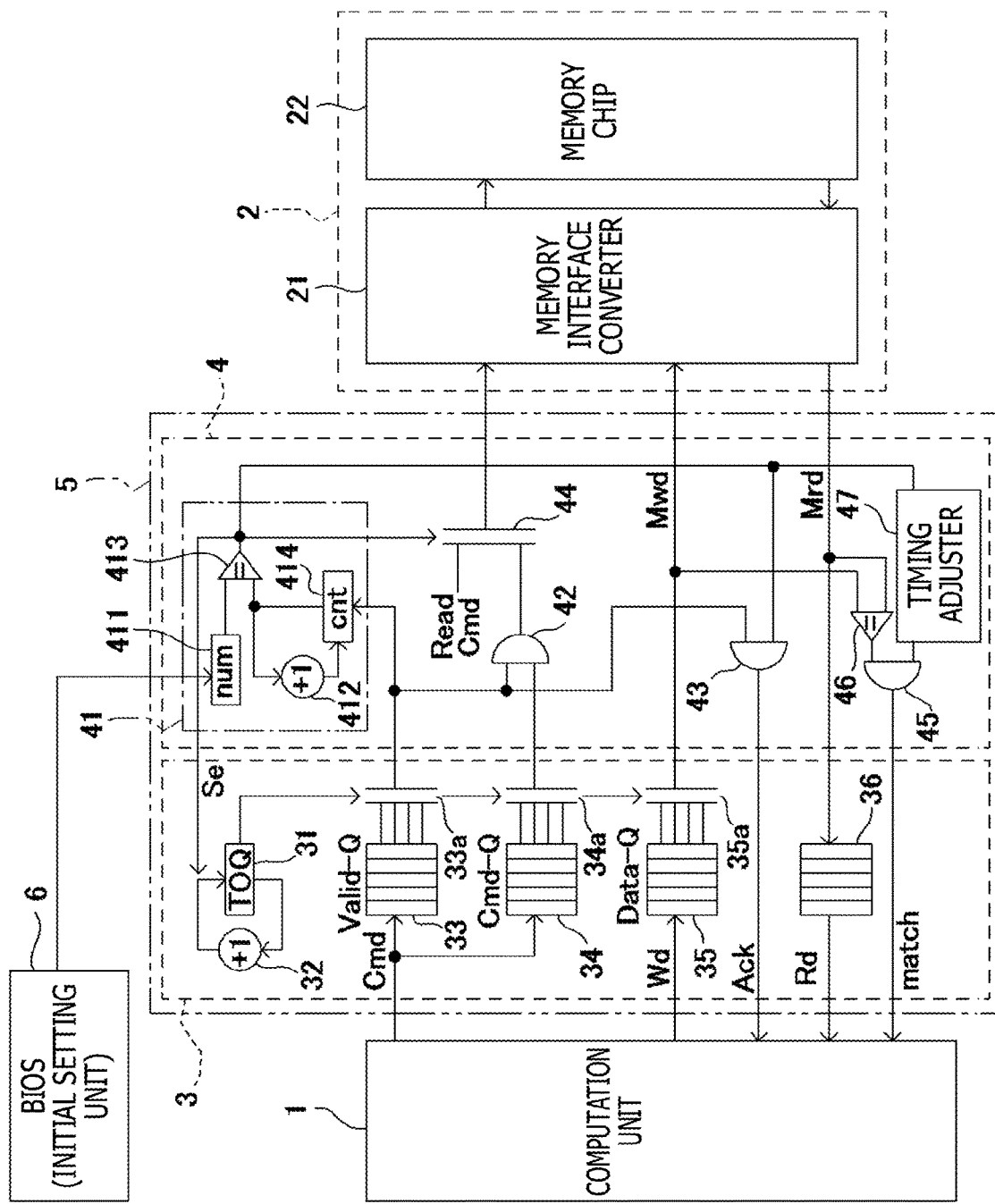
FIG. 7 illustrates an example of an information processor.
Figure 8:
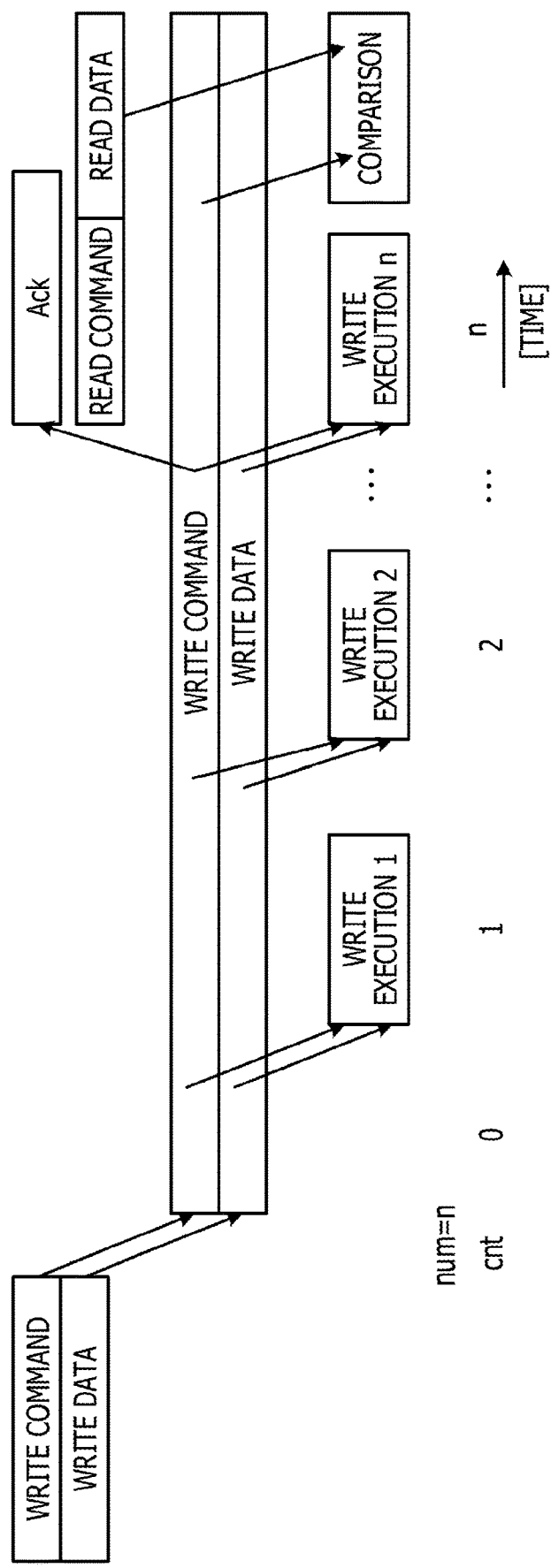
FIG. 8 illustrates an example of operation of a memory controller illustrated in FIG. 7.

FIG. 7 illustrates an example of an information processor. FIG. 8 illustrates an example of operation of a memory controller illustrated in FIG. 7. As is apparent from the comparison between FIG. 7 and FIG. 5, the information processor illustrated in FIG. 7 further includes a multiplexer 44, AND gate 45, comparator 46, and timing adjuster 47. The AND gate 45, comparator 46, and timing adjuster 47 form an agreement determination circuit.

The multiplexer 44 selects the write command from the command queue 34 (command multiplexer 34a) or the read command (Read Cmd) to output it to the memory 2, and is controlled by the output of the comparator 413. The comparator 46 compares write data Mwd to the memory 2 and read data Mrd from the memory 2. If these two data equal, the comparator 46 outputs a high level "H". The AND gate 45 receives the output of the comparator 46 and the output of the timing adjuster 47 which delays the output of the comparator 413. When both are "H", the AND gate 45 outputs an agreement signal (match) of "H" to the computation unit 1.

As illustrated in FIG. 8, the information processor is configured to compare the write data Mwd to the memory 2 and the read data Mrd read from the memory 2 after the n writing operations, and output the comparison result (match) to the computation unit 1. With this, for example, it is possible for the computation unit 1, when the write processing is not properly executed, to detect an error at that timing.

Figure 9:
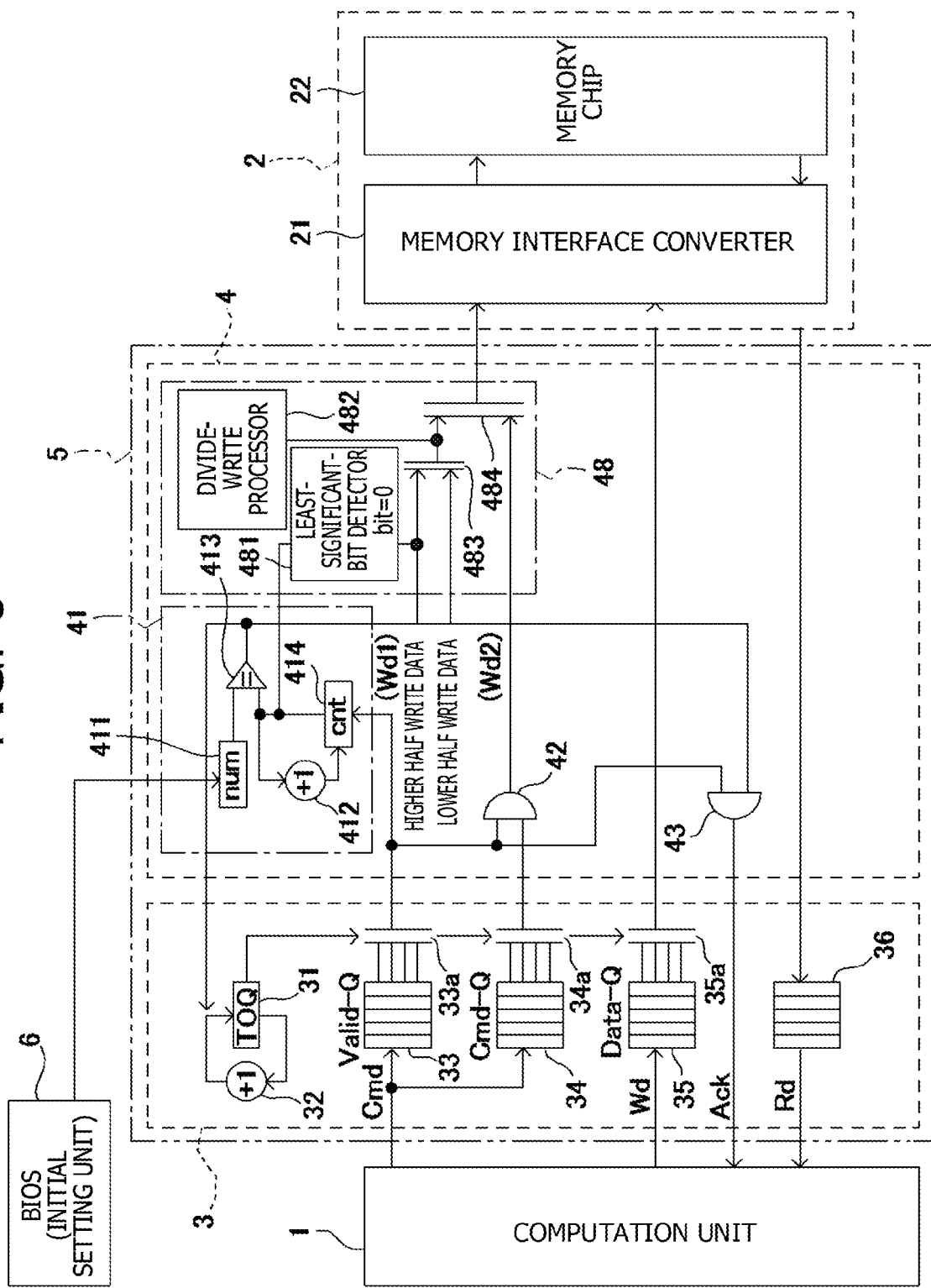
FIG. 9 illustrates an example of an information processor.
Figure 10:
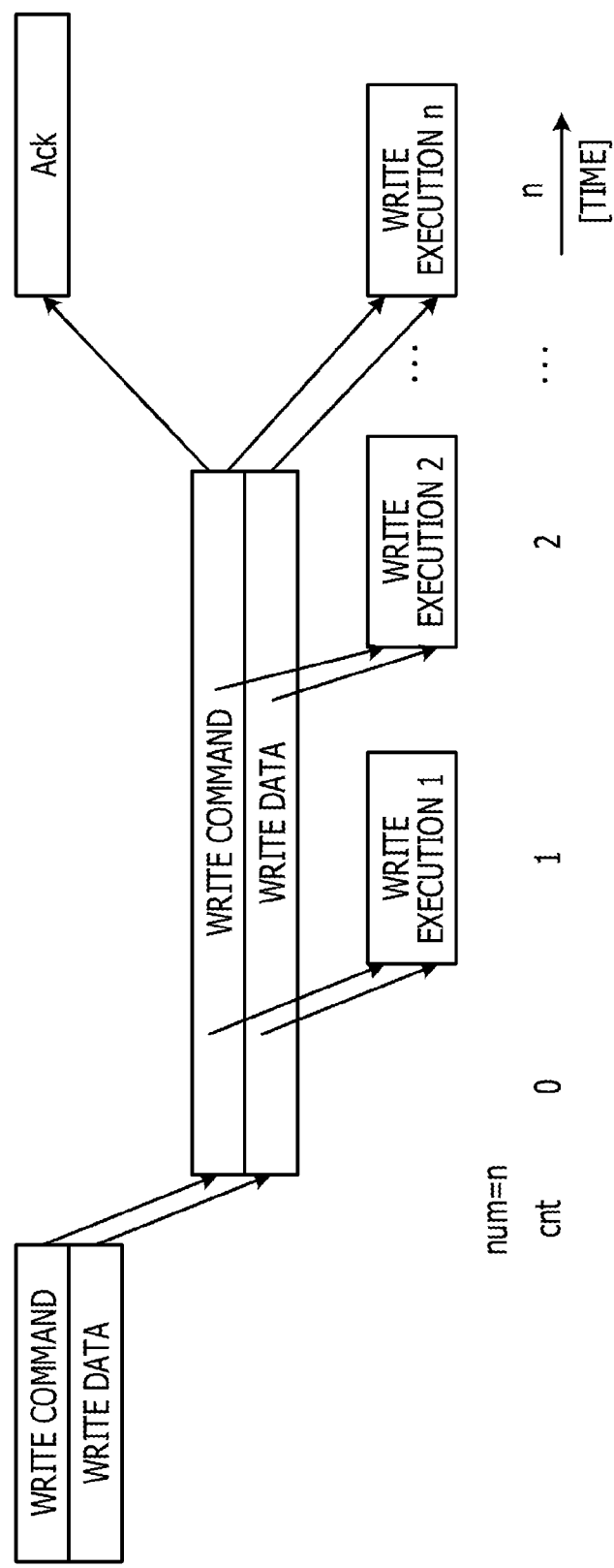
FIG. 10 illustrates an example of operation of a memory controller illustrated in FIG. 9.

FIG. 9 illustrates an example of an information processor. FIG. 10 illustrates an example of operation of a memory controller illustrated in FIG. 9. As is apparent from the comparison between FIG. 9 and FIG. 5, the information processor further includes a divide-write control circuit 48. The divide-write control circuit 48, for example, divides the write data Wd into higher half write data Wd1 and lower half write data Wd2, and executes the writing operation to the memory 2 multiple times based on the divided write data Wd1 and Wd2. For example, the number of writing operations n is an even number. It represents that if the write data Wd is divided, for example, into two parts: write data Wd1 and Wd2, the write data Wd are written n/2 times.

The divide-write control circuit 48 includes a least-significant-bit detector 481, a divide-write processor 482, and multiplexers (selection circuits) 483 and 484. The least-significant-bit detector 481 determines the higher half write data Wd1 and the lower half write data Wd2 based on the least significant bit of the counter 414, and controls the multiplexer 483. The divide-write processor 482 controls the multiplexer 484 which switches the outputs of the multiplexer 483 and the AND gate 42 to output one of these outputs to the memory 2.

As illustrated in FIG. 10, in the information processor, the write data Wd (for example, 32 bytes) are divided into the higher half write data Wd1, which are the higher 16 bytes, and the lower half write data Wd2, which are the lower 16 bytes. Further, the higher half write data Wd1 and the lower half write data Wd2 are alternately written to the memory 2 multiple times. Note that the number into which the write data Wd is divided is not limited to two, but may be three or more.

Figure 11:
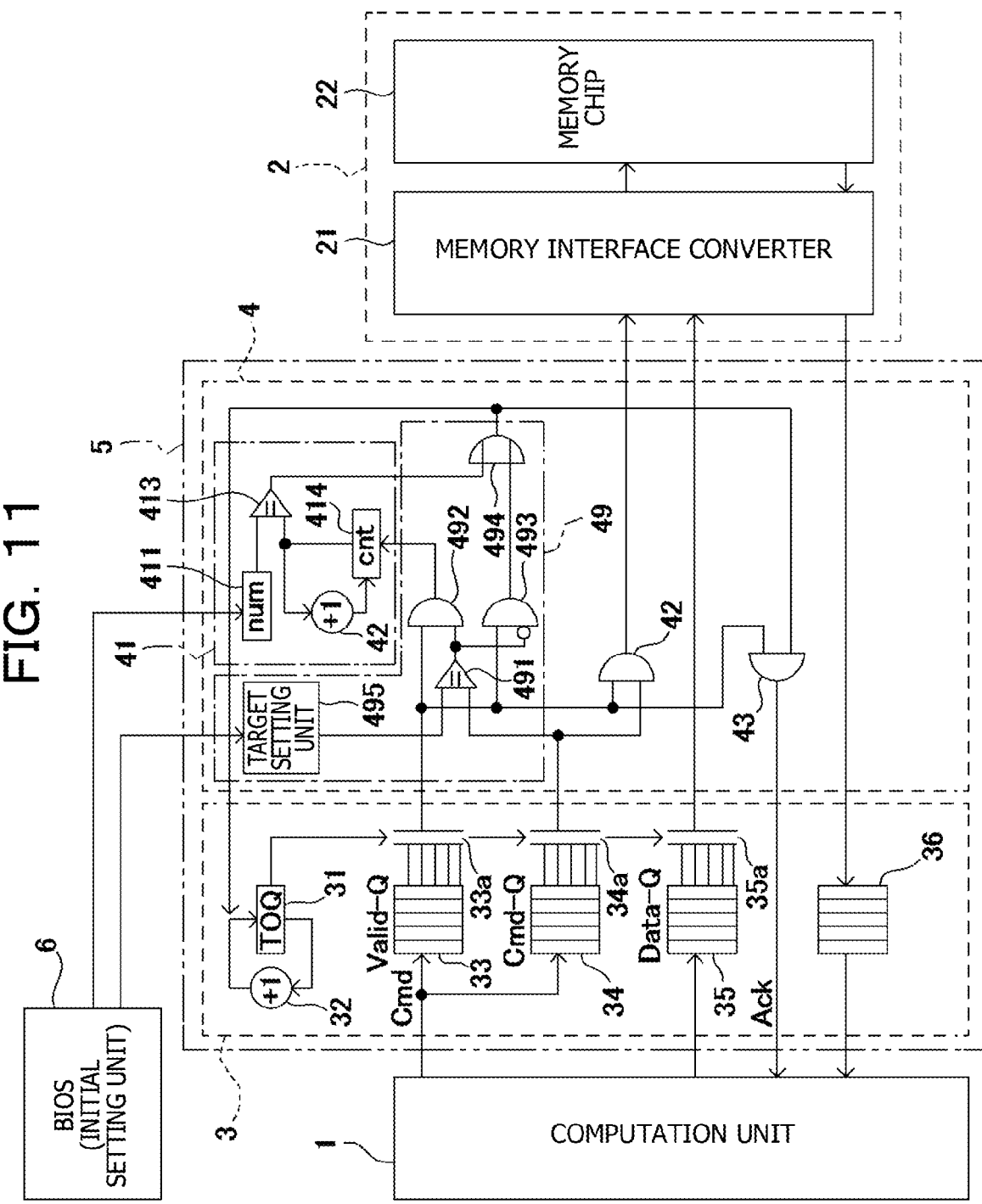
FIG. 11 illustrates an example of an information processor.

FIG. 11 illustrates an example of an information processor. As is apparent from the comparison between FIG. 11 and FIG. 5, the information processor further includes a target-command setting circuit 49 which sets a command for which multiple writing operations are executed for a single write command. The target-command setting circuit 49 includes a comparator 491, AND gates 492 and 493, an OR gate 494, and a target setting unit 495. One of the inputs of the AND gate 493 which receives the output of the comparator 491 is an inverting input.

In the target setting unit 495, for example, a target command described above for which multiple writing operations are executed for a single write command is set by the initial setting of the BIOS 6. The comparator 491 compares the outputs of the target setting unit 495 and the command multiplexer 34a. If a command is the target command for the processing, multiple writing operations are performed using the number-of-writing-operations setting circuit 41 and the like. Note that if the outputs of the target setting unit 495 and the command multiplexer 34a do not agree to each other, an ordinary writing operation (single writing operation) is executed. It goes without saying that the target-command setting circuit 49 illustrated in FIG. 11 is a mere example and various modifications and changes may be made thereon.

As described above, the information processor (memory controller 5) illustrated in FIG. 11 is configured to execute the processing not for all the commands, but, for example, only for predetermined commands set in advance in the target setting unit 495 as the initial setting by the BIOS. Since executing multiple writing operations for a single write command affects the performance, for example, it may be done only in the case where evaluation does not progress at the time of evaluation before shipment because of the problem that the memory write operation is not executed properly, or a similar case. Alternatively, it is possible that multiple writing operations are applied not to all write commands, but only to a minimum number of commands. This makes it possible to achieve the proper write processing while minimizing the influence on the performance.

According to the foregoing embodiments, when a writing operation to the memory 2 is instructed to the memory controller 5, it is possible to execute the writing operation to the memory multiple times for a single write instruction. Writing the same data to the same address in a memory multiple times does not cause any problem. Since the same writing operation is executed multiple times, even in the case where a dropout of writing occurs during the writing operations for some reason, if the data are written correctly at least once, the write processing is successful.

However, since the writing operation to the memory 2 is executed multiple times for a single write instruction, although the memory write is throw-off type processing, if the data queue runs out, influence on the performance occurs. For this reason, for example, it is preferable that this function may be enabled by the initial setting from the BIOS or the like in the case where the evaluation does not progress because a writing of data occurs during writing operations for some reason at the time of evaluation before shipment, or in a similar case. By providing a function in the memory controller 5 (number-of-writing-operations control circuit 4) to compare write data and the read data, it is possible to judge whether the written data are correct, immediately after the memory write operation, which facilitates investigation in the case where the written data are not correct. Further, in the case where a problem is found after the evaluation is completed and it is impossible to fix the problem before the shipment, for example, it is possible to take the foregoing measures for a minimum number of commands.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A memory controller comprising:
a memory access control circuit which receives a write command and write data from a processor and controls a writing operation to a memory; and
a number-of-writing-operations control circuit which performs control to execute the writing operation of the write data which is requested to be written to the memory by the write command to the memory at least two or more times, based on the write command,
the memory access control circuit includes a command queue to store the write command from the processor and a valid queue to store a valid signal indicating whether the write command is valid or invalid,
the number-of-writing-operations control circuit includes a number-of-writing-operations setting circuit which sets a number of writing operations to the memory and a gate circuit, and
the number-of-writing-operations setting circuit includes:
a register to which the number of writing operations to the memory is set based on an initial setting by a BIOS;
a counter which is coupled to an output of the valid queue and counts the valid signal indicating valid as the number of writing operations to the memory; and
a comparator which compares an output of the register and an output of the counter,
the gate circuit includes a first input terminal coupled to the output of the valid queue, a second input terminal coupled to one of an output of the command queue and an output of the comparator and an output terminal configured to output an acknowledgement to the processor,
the memory access control circuit executes a next operation based on an output of the comparator.

2. The memory controller according to claim 1, wherein the number-of-writing-operations control circuit executes, for a single write command, the writing operation to the memory times of the number set in the number-of-writing-operations setting circuit repeatedly.

3. The memory controller according to claim 1, wherein the number-of-writing-operations control circuit includes:
an agreement determination circuit which compares data to be written to the memory and data read from the memory to which the writing operation has been executed the multiple times, and which outputs an agreement signal to the processor.

4. The memory controller according to claim 1, wherein the number-of-writing-operations control circuit selects returning the acknowledgement to the processor, based on a first writing operation of the multiple writing operations to the memory when the second input terminal of the gate circuit is coupled to the output of the command queue, or returning the acknowledgement to the processor, based on a last writing operation of the multiple writing operations to the memory when the second input terminal of the gate circuit is coupled to the output of the comparator.

5. The memory controller according to claim 1, wherein the number-of-writing-operations control circuit includes: a divide-write control circuit which divides the write data into multiple partial write data and performs control to execute multiple writing operations to the memory based on the multiple partial write data generated by the division.

6. The memory controller according to claim 1, wherein the memory access control circuit includes: a command queue to store the write command; a write data queue to store the write data; a valid queue to store a valid flag for the command queue; a top of queue to indicate heads of the command queue, the write data queue, and the valid queue; and a read data queue to store data read from the memory.

7. The memory controller according to claim 1, wherein the number-of-writing-operations control circuit includes: a target-command setting circuit which performs control such that the writing operation to the memory is executed multiple times for a predetermined command set in advance.

8. The memory controller according to claim 7, wherein the predetermined command is a read-modify-write command, and the memory is a stacked memory such as a hybrid memory cube.

9. An information processor comprising:
a processor;
a memory; and
a memory controller which controls the memory and includes:
  a memory access control circuit which receives a write command and write data from the processor and controls a writing operation to the memory; and
  a number-of-writing-operations control circuit which performs control to execute the writing operation of the write data which is requested to be written to the memory by the write command to the memory at least two or more times, based on the write command,
the memory access control circuit includes a command queue to store the write command from the processor and a valid queue to store a valid signal indicating whether the write command is valid or invalid,
the number-of-writing-operations control circuit includes a number-of-writing-operations setting circuit which sets a number of writing operations to the memory and a gate circuit, and
the number-of-writing-operations setting circuit includes:
  a register to which the number of writing operations to the memory is set based on an initial setting by a BIOS;
  a counter which is coupled to an output of the valid queue and counts the valid signal indicating valid as the number of writing operations to the memory; and
  a comparator which compares an output of the register and an output of the counter,
the gate circuit includes a first input terminal coupled to the output of the valid queue, a second input terminal coupled to one of an output of the command queue and an output of the comparator and an output terminal configured to output an acknowledgement to the processor,
the memory access control circuit executes a next operation based on an output of the comparator.

10. The information processor according to claim 9, wherein the number-of-writing-operations control circuit executes, for a single write command, the writing operation to the memory times of the number set in the number-of-writing-operations setting circuit repeatedly.

11. The information processor according to claim 9, wherein the number-of-writing-operations control circuit includes: an agreement determination circuit which compares data to be written to the memory and data read from the memory to which the writing operation has been executed the multiple times, and which outputs an agreement signal to the processor.

12. The information processor according to claim 9, wherein the number-of-writing-operations control circuit selects returning an acknowledgement to the processor, based on a first writing operation of the multiple writing operations to the memory when the second input terminal of the gate circuit is coupled to the output of the command queue, or returning the acknowledgement to the processor, based on a last writing operation of the multiple writing operations to the memory when the second input terminal of the gate circuit is coupled to the output of the comparator.

13. The information processor according to claim 9, wherein the number-of-writing-operations control circuit includes: a divide-write control circuit which divides the write data into multiple partial write data and performs control to execute multiple writing operations to the memory based on the multiple partial write data generated by the division.

14. The information processor according to claim 9, wherein the memory access control circuit includes: a command queue to store the write command; a write data queue to store the write data; a valid queue to store a valid flag for the command queue; a top of queue to indicate heads of the command queue, the write data queue, and the valid queue; and a read data queue to store data read from the memory.

15. The information processor according to claim 9, wherein the number-of-writing-operations control circuit includes: a target-command setting circuit which performs control such that the writing operation to the memory is executed multiple times for a predetermined command set in advance.

16. A memory control method comprising:
receiving, by a memory access control circuit in a memory controller, a write command and write data from a processor and controls a writing operation to a memory; and
performing, by a number-of-writing-operations control circuit in the memory controller, control to execute the writing operation of the write data which is requested to be written to the memory by the write command to the memory at least two or more times, based on the write command,
the memory access control circuit includes a command queue to store the write command from the processor and a valid queue to store a valid signal indicating whether the write command is valid or invalid,
the number-of-writing-operations control circuit includes a number-of-writing-operations setting circuit which sets a number of writing operations to the memory and a gate circuit, and
the number-of-writing-operations setting circuit includes:
  a register to which the number of writing operations to the memory is set based on an initial setting by a BIOS;
  a counter which is coupled to an output of the valid queue and counts the valid signal indicating valid as the number of writing operations to the memory; and
  a comparator which compares an output of the register and an output of the counter, the gate circuit includes a first input terminal coupled to the output of the valid queue, a second input terminal coupled to one of an output of the command queue and an output of the comparator and an output terminal configured to output an acknowledgement to the processor, the memory access control circuit executes a next operation based on an output of the comparator.

17. The memory control method according to claim 16, wherein a number of writing operations to the memory is set based on an initial setting by a BIOS.

18. The memory control method according to claim 16, further comprising: selecting one of: returning an acknowledgement to the processor, based on a first writing operation of the multiple writing operations to the memory when the second input terminal of the gate circuit is coupled to the output of the command queue, and returning the acknowledgement to the processor, based on a last writing operation of the multiple writing operations to the memory when the second input terminal of the gate circuit is coupled to the output of the comparator.

19. The memory control method according to claim 16, wherein the executing the writing operation to the memory multiple times is performed when the memory is evaluated and is not performed when the memory is used actually.

* * * * *